US008683446B2

(12) United States Patent
Paradkar et al.

(10) Patent No.: US 8,683,446 B2
(45) Date of Patent: Mar. 25, 2014

(54) GENERATION OF TEST CASES FOR FUNCTIONAL TESTING OF APPLICATIONS

(75) Inventors: Amitkumar Manoharrao Paradkar, Mohegan Lake, NY (US); Avik Sinha, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 1582 days.

(21) Appl. No.: 11/775,090

(22) Filed: Jul. 9, 2007

(65) Prior Publication Data

US 2009/0018811 A1 Jan. 15, 2009

(51) Int. Cl.
*G06F 9/44* (2006.01)

(52) U.S. Cl.
USPC .......................................................... 717/126

(58) Field of Classification Search
USPC ......... 717/100, 105, 117, 109, 124, 136, 104, 717/110, 126; 715/234, 237, 762, 809; 709/206, 201, 220; 719/328, 330; 714/25, 819, 38; 703/17; 707/104.1; 379/298
See application file for complete search history.

(56) References Cited

U.S. PATENT DOCUMENTS

| | | | | |
|---|---|---|---|---|
| 7,340,469 | B1 * | 3/2008 | Alghathbar et al. | 1/1 |
| 7,665,064 | B2 * | 2/2010 | Able et al. | 717/117 |
| 2004/0117759 | A1 * | 6/2004 | Rippert et al. | 717/100 |
| 2004/0207659 | A1 * | 10/2004 | Goodman et al. | 345/762 |
| 2005/0060372 | A1 * | 3/2005 | DeBettencourt et al. | 709/206 |
| 2005/0154939 | A1 * | 7/2005 | De Pauw et al. | 714/25 |
| 2005/0193266 | A1 * | 9/2005 | Subramanian et al. | 714/38 |
| 2006/0031256 | A1 * | 2/2006 | Bosworth et al. | 707/104.1 |
| 2006/0129978 | A1 * | 6/2006 | Abrari et al. | 717/110 |
| 2007/0006134 | A1 * | 1/2007 | Larvet et al. | 717/104 |
| 2007/0168971 | A1 * | 7/2007 | Royzen et al. | 717/124 |
| 2008/0066009 | A1 * | 3/2008 | Gardner et al. | 715/809 |
| 2008/0304650 | A1 * | 12/2008 | Catlin et al. | 379/298 |

* cited by examiner

*Primary Examiner* — Tuan A Vu
(74) *Attorney, Agent, or Firm* — Scully, Scott, Murphy & Presser, P.C.; Daniel P. Morris, Esq.

(57) ABSTRACT

An automated system and method to generate functional conformance tests for applications are provided. The system and method in one aspect use Inputs, Outputs, Preconditions, Effects (IOPEs) paradigm associated with an application for automatically generating test goals. A planner component may accept these testing goals to generate a sequence of operations or invocations as a test case. Verification sequences are also generated. The system and method also allow generation of executable test cases, which can be applied to the various interfaces through which the application may be accessed.

15 Claims, 4 Drawing Sheets

GENERATION OF TEST CASES FOR FUNCTIONAL TESTING OF APPLICATIONS

FIELD OF THE INVENTION

The present disclosure relates generally to computer systems and more particularly to automatically generating test cases for functional testing of applications.

BACKGROUND OF THE INVENTION

Software applications are increasingly becoming the core of businesses in various industries, as a result of which functional conformance testing of software applications is playing an important part of the development and implementation effort. Functional conformance testing is an activity, which ensures that the implementation conforms to some expected software behavior. A functional test case generally has three main components: set up sequence, test action, and verification sequence. A set up sequence comprises of one or more input actions for the software necessary to drive the software to a state, which can enable a test action. A test action is some input action for the software under test along with an expected output from the software. If the software produces the expected output, the software is said to "pass" the test otherwise it is said to "fail" the test. A verification sequence comprises of one or more input actions followed by an expected output from the software. The purpose of the verification sequence is to determine that the internal state of the software is consistent with its behavior during the test.

Automatic generation of test cases for a given software application helps reduce errors in testing and also makes the process more manageable. Model-Based conformance Test Generation (MBTG) is one technique to automate generation of test cases. In MBTG, the test cases are generated on the basis of a model for the software. Typically, the models are described in terms of operations provided by the system under test (SUT) and include for each operation a description in terms of its Inputs, Outputs, Preconditions, and Effects (IOPEs)

In the past, MBTG techniques required the test designer to additionally provide the test objective specifications to guide the test generation process. This becomes a cumbersome requirement for the test designer for almost all commercial software applications. Also, using the IOPE representation some past techniques have proposed techniques for automatic test generation. However, these techniques only partially automate the test generation process—typically generating a set of transition sequence with constraints on parameters and state. However, the constraints on these transition sequences may not be feasible. The tester has the responsibility of determining feasibility of each sequence and of generating concrete values corresponding to parameters for each transition in a sequence. These techniques do not typically address the issue of generating verification sequence—a sequence, which enables verification of system state (both control and data) obtained as a result of applying each transition sequence.

Petrenko et al. describe a technique for generating such sequences for IOPE models. However, their technique is only applicable for a restricted set of models. For instance, their technique is not applicable to UML object diagrams. Another technique, named the BZ-TT testing technique also recognizes the issue of verification sequence generation. However, it requires the tester to identify a subset of model operations, which do not modify the system state but return some aspect of the system state to the environment as observer operations. An appropriate invocation of each observer operation is appended to each generated test case. While observer operations are very beneficial, a suitable observer operation may not be available for each system state variable.

Thus, it is desirable to have an IOPE model-based test generation environment, which addresses the aforementioned issues of generating verification sequences and automatically selecting the test objectives.

BRIEF SUMMARY OF THE INVENTION

A computer implemented method, system and program storage device having instructions executable on a machine for generating a testing procedure for an implementation of a function are provided. The system and method in one aspect use Inputs, Outputs, Preconditions, Effects (IOPEs) paradigm associated with an application for automatically generating one or more test goals. A planner component may accept these one or more testing goals to generate a sequence of one or more operations or invocations as a test case. Verification sequences may be also generated. The system and method may further allow generation of executable test cases, which can be applied to the various interfaces through which the application may be accessed.

A computer implemented method for generating a testing procedure for an implementation of a function, in one aspect, may comprise obtaining a model of an application including at least a description of input, output, and one or more state transitions of a function in the application. The method may also comprise deriving one or more input conditions and one or more state conditions as one or more testing objective and deriving from the model a sequence of one or more actions to set up said one or more state conditions. The method may further comprise deriving from the model one or more expected outputs associated with an implementation of the function under said one or more state conditions and deriving from the model an expected end state, and a second sequence of one or more actions and one or more expected outputs of the second sequence of one or more actions to verify the end state.

A computer implemented method for generating a testing procedure for an implementation of a function, in another aspect, may comprise obtaining a model of an application, the model including at least one or more objects, one or more inputs and outputs associated with said one or more objects, one or more preconditions, and one or more effects associated with the application. The method may also comprise generating a testing goal from the model, the testing goal including at least a state condition and a testing function, generating a sequence of one or more actions based on the testing goal, generating one or more expected output and a system end state associated with applying the sequence of one or more actions, and generating a sequence of one or more verification actions based on said one or more expected output and the system end state.

A system for generating a testing procedure for an implementation of a function, in one aspect, may comprise an application model including at least one or more objects, one or more inputs and outputs associated with said one or more objects, one or more preconditions, and one or more effects associated with the application. The system may also comprise a goal generator module operable to execute on a processor, the goal generator module further operable to automatically generate one or more testing goals using the application model. The system may further comprise a planner module operable to execute on a processor to generate a sequence of one or more actions based on said one or more testing goals and a verification sequence generator module operable to execute on a processor to generate a sequence of one or more verification actions based on one or more expected outputs from the sequence of one or more actions and an expected system end state resulting from the sequence of one or more actions.

Further features as well as the structure and operation of various embodiments are described in detail below with reference to the accompanying drawings. In the drawings, like reference numbers indicate identical or functionally similar elements.

DETAILED DESCRIPTION

Figure 1:
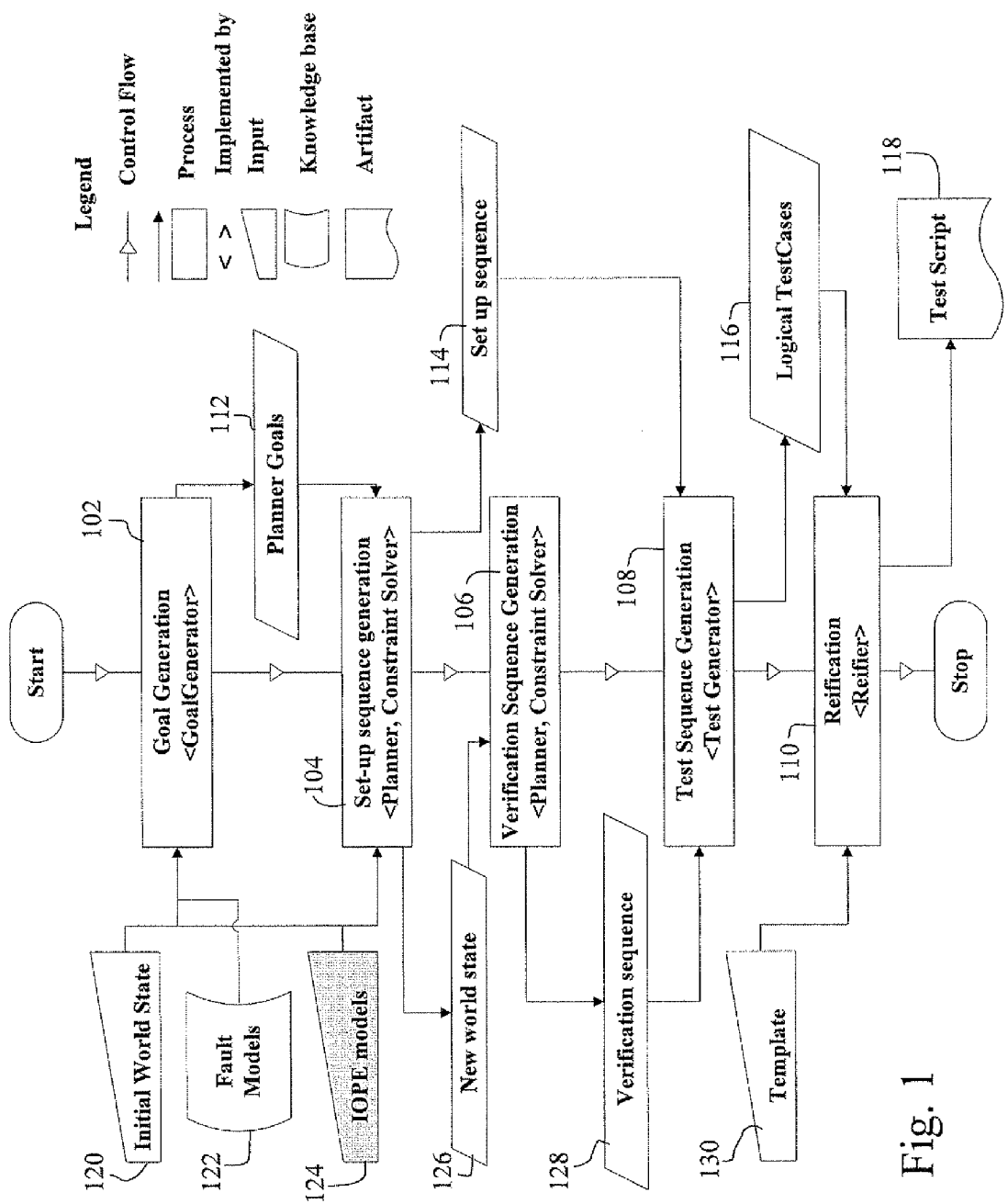
FIG. 1 illustrates a method in one embodiment of the present disclosure for generating test cases from the IOPE description of the web services.

A system and method for automatically generating test cases for functional testing of applications in one embodiment use information available in the description of the application. Such information may include various functionalities of the application, inputs and outputs associated with the functionalities, preconditions and effects on a system implementing the application. For instance, a system and method for automatically generating test cases for functional testing of web application in one embodiment use information present in description of web services that implement the application. The system and method of the present disclosure in one embodiment leverages the input, output, precondition and effect (IOPE) information that is made available in the web service description via the new semantic web standards like WSDL-s, OWL-s, etc. Using these standards, for example, the web service descriptions can capture the precondition and effect in addition to the standard input and output information. This information allows one to define behavioral model that can effectively capture the state dependant behavior. Such a model may be derived automatically and used for the purposes of test generation. Using this techniques, one can: 1) generate expected outputs in conjunction with the test inputs; 2) generate action sequences to verify state of the systems; 3) achieve full automation for functional test case generation.

While the following description refers to web services and using web services standards as examples, the system and method of the present disclosure may function or may be applied to any other applications, in which the similar information can be obtained.

In one embodiment, a model is derived of an application, for example, implemented by web services, by utilizing the information present in their semantically enriched description. Such a model may include a domain model and a behavioral model. A domain model in one embodiment may include a description of the application domain in terms of the various types of the domain objects and the relations between them. A behavioral model describes application behavior in the context of the domain model. In one embodiment, applications or web services are represented in a model as behavior modifying functions that can be triggered when certain pre-conditions are satisfied with an input message and that produces an output message while modifying the state of the system in a manner to enact the effect.

In one embodiment of the system and method of the present disclosure, testing goals are produced for each application or web service. For example, testing goals may be refinements of the preconditions of an application such as a web service using a set of fault models. Fault models include or describe one or more known ways the application can fail. A novel planner component accepts these testing goals, web service definitions, along with an initial state of the world to generate a sequence of web service invocations as a test case. An initial state of the world refers to a state of the system before the application is invoked. The system and method of the present disclosure in one embodiment also generate verification sequences, for example, to ensure that the changes to the world produced by an effect are implemented correctly. A given application such as one that incorporates a set of semantic web services may be accessible through several interfaces such as 1) Direct Invocation of the web services or 2) a Graphical User Interface (GUI). Executable test cases may be generated and applied through one or more of those and other interfaces.

Test generation technique of the present disclosure in one embodiment exploits the IOPE information in the operations of applications such as web services, but not limited to only web services, to generate a small yet effective set of test cases. For other applications in general, similar available information may be used. Based on the pairs of precondition and effect in the IOPE, a method of the present disclosure in one embodiment generates testing goals which reflect the best practices in black box testing such as boundary values, cardinality of collections, fault sensitization, etc. Each of these testing goals is then input to an AI (artificial intelligence) planner component to derive a sequence of operations that satisfies the testing goals. To generate the verification sequences, a method of the present disclosure in one embodiment uses mutations of the world state obtained as a result of applying the aforementioned sequence of operations. Mutations of the world state include error or inconsistent conditions. A sequence, which distinguishes each resulting mutant world state from the original world state is generated through a suitable formulation and solution of another planning problem.

In another embodiment, to address the issue of end user testing, a system and method of the present disclosure provide another artifact, referred to as test template, which represents the manner in which the end user deploys and navigates the application such as the web services in its presentation layer. These test templates are used to transform the test cases generated through the planning process into an executable set of test cases, which can be run using available GUI test execution automation tools such as Rational Function Tester.

FIG. 1 illustrates a method in one embodiment of the present disclosure for generating test cases from the IOPE description of an application, for example, the web services. To facilitate the testing process, an initial state of the world may be also specified as shown at 120. An initial state of the world refers to the state of the system before the application is invoked. At 102, a test generation approach of the present disclosure in one embodiment derives test objectives (also referred to as testing goals) for each PE pair for each. A derivation of testing goals leverages a set of fault models shown at 122, each of which may represent a best practice in the testing literature. These fault models 122 may include boundary values for world state attributes and the input parameters; cardinality constraints for each collection valued world domain model attribute and the notion of fault sensitization. A cardinality constraint refers to a constraint regarding the number of elements in a collection. For instance, a cardinality constraint may be that the number of element of a set must be less than 3. Fault sensitization is a technique based on the intuition that each testing goal should target exactly one interesting aspect of the operation's behavior. Otherwise, potential faults may be masked. In semantic web services, the need for fault sensitization may arise because of the overlapping preconditions between two pairs of PEs for a given operation.

These testing goals 112, along with the web service IOPE description 124, and an initial state of the world 120 are input to a planner component for generation of the set up sequences at 104. The planner and other components in this testing approach also may rely on a suite of constraint solvers for various domains including linear arithmetic, String, Boolean, Enumerated, Set, and List. A constraint solver in one embodiment provides a functionality to compute one or more solutions for a set of constraints. For instance, if a linear constraint solver is executed with constraints of "x>5" and "x+3<10" then it will find a solution as "x=6" which satisfies both the constraints. The planner may extend the well-known Graphplan planning algorithm to address the creation and deletion of instances in the world. Graphplan algorithm is described in A. L. Blum and M. L. Furst. Fast planning through planning graph analysis. Artificial Intelligence, 90(1-2):279-298, 1997. Other enhancements to the Graphplan algorithm include ability to handle numeric, string, and collection valued parameters on the operations.

The planning step at 104 generates a Set Up subsequence 114. The testing goal also may include one or more constraints on input parameters for the corresponding operation, that is, the operation under test. These constraints, for example, are those that only concern the I's in the IOPE model. At the end of the planning process, the only unresolved variables in the constraint system are the input and output parameters of the operation under test. This is because the planner is concerned primarily with the internal state of the system and generally is unaware of the constraints on the input and output parameters. Thus, in one embodiment, a separate constraint system is formed from the constraints on inputs and outputs. Solution of this constraint system leads to the generation of the test invocation 128.

Simulation of the test sequence generated so far results in a modified world state 126. That is, after having applied the generated subsequence of actions on the system, it is expected that a change in the state of the system occurred. At step 106, a test generation method of the present disclosure in one embodiment generates a verification sequence 128 to validate that this world state is also reflected in the internal system state of the implementation. To do so, at step 108, the method of the present disclosure in one embodiment derives a set of mutant world states based on the expected world state using various fault models such as 1) No Instance Creation—which negates the effects of instance creation, 2) No Attribute Update—which negates the effect of modifying an attribute of an instance, and 3) Normal Effects in Exception—which augments the effects associated with an exceptional behavior with each of the individual effects in the successful behavior of the same operation. Fault models used are not limited to only the three listed, but may include other fault models. The third mutant enables the system and method of the present disclosure to generate test cases, which ensure that no unwarranted behavior is exhibited by the implementation. The method exploits the planner to generate a sequence, which distinguishes the mutant world state from the expected one.

In one aspect, the resulting logical test case 116 may be in an execution harness independent format, which cannot be executed directly. In order to produce an executable test case, the method of the present disclosure allows the user to specify a template 130, which contains the necessary code fragments for each web service operation or operation of an application. This template contains placeholders for input and output parameters so that the corresponding actual values can be substituted from the logical test case. At 110, test script 118 is produced.

An example is illustrated with reference to a web service used to manage orders of an E-trading site called OrderMgmt. OrderMgmt has operations such as Create Order, Read Order, and Delete Order and like. In OWL-S description, each operation is defined using an Input, Output, and a set of pairs of Precondition and an Effect. An example of an abstract IOPE description for the operations in OrderMgmt is given below:

Create Order:
    I = {accNo :: Integer, pID :: Integer, n :: Integer};
    O = {oID :: Integer};
    {(P,E)} = {(∃c : c :: Customer . c.acctNo == accNo .
∃p : p :: Product . p.productId == pID, ∃o : o :: Order . o.acc == oID)}
Read Order:
    I = {oID :: Integer};
    O = {ord :: Order};
    {(P,E)} = {(∃o : o :: Order . o.orderId == oID, ord == o),
(∀ o : o :: Order . o.orderId ≠ oID, ord == NULL)}
DeleteOrder:
    I = {oID :: Integer};
    O = {result :: String};
    {(P,E)} = {(∃o : o :: Order . o.orderId == oID,
∀ o : o :: Ordero.orderId ≠ oID . result == "Success"),
(∀ o : o :: Order . o.orderId ≠ oID, result == "Failure")}

For example, operation Create Order takes three inputs to identify the Customer, Product and the number of items for the chosen product. It produces one output: the reference number for the Order created. The PE pair for Create Order states that if the specified customer and product exists, then a new order is created (this example does not describe the PEs which handle the situations when the customer or the product does not exist). Similarly, Read Order accepts an order id, and returns the complete order details if one exists. The error situation, when the order does not exist, is also modeled for Read Order.

Figure 2:
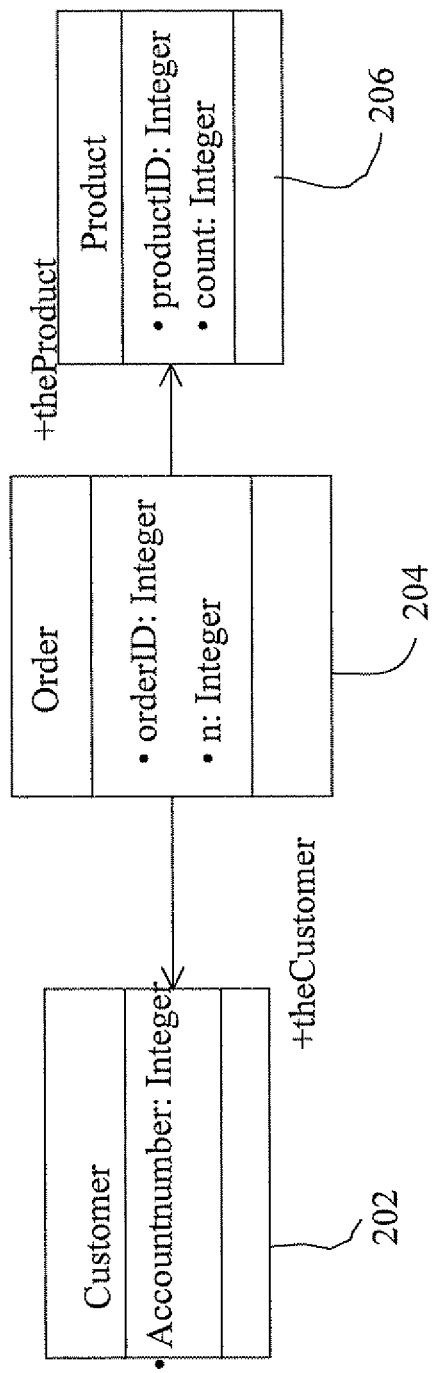
FIG. 2 illustrates a model generated in one embodiment of the present disclosure to represent the example web service used to manage orders.

FIG. 2 illustrates a model generated in the present disclosure to represent the example web service used to manage orders. FIG. 2 shows a model in a form of a domain ontology for OrderMgmt using a UML class diagram with appropriate attributes. Other model representations are possible. A model of an application for which test cases are being generated includes one or more functions and objects that comprise the application, input and output parameters associated with those functions and objects, and preconditions and effects associated with those functions and objects. Preconditions and effects may include state transitions associated with those functions and objects. It is possible that the values of preconditions and effects may be null depending on the associated functions and objects. The world state for OrderMgmt includes instances of customer 202, order 204 and product 206 of this class diagram, along with suitable values for attributes. If the initial world state included an instance of customer 202 and product 206, an instance of order 204 may be created as a result of simulating a set of subsequences for testing a goal, for example, create order.

The IOPE model is analyzed to generate testing goals for each PE pair in each operation. The method in one embodiment of the present disclosure applies several refinements to one or more preconditions of a PE pair in order to accomplish this task. Refinement is the process through which a precondition is modified to represent software faults. These refinements in one embodiment are based on fault models, which represent common programming errors and best test practices. An example is illustrated of applying the cardinality refinement to the preconditions. The precondition may have a cardinal constraint, which can be refined as described in the example. The principle behind the cardinality refinement derives from the quantifiers present in the preconditions of operation. Types of quantifiers may include the universal and the existential quantifiers. A universal quantifier asserts the constraint for all kinds of that variable. A universal quantifier implies iteration over a collection valued domain model entity D such as instances of a class or members of an association to check for a certain property. An existential quantifies asserts that there exists at least one instance of the variable for which the constraint is satisfied.

A testing goal may include scenarios to check the behavior when the collection D is empty to begin with. Other testing goal may include scenarios where the collection has cardinality of one. Yet another testing goal may treat all the other cardinalities (≥2) as same. The method of the present disclosure in one embodiment refines this practice in testing goal generation and derive from each universal quantified expression over collection D, three independent testing goals by conjoining the original flow condition with one of the following. COUNT(D)=0, COUNT(D)=1, COUNT(D)≥2. Similarly, for an existential quantified guard condition, two independent testing goals may be derived by conjoining one of COUNT(D)=1, COUNT(D)≥2. Note that the case where the collection is empty is not relevant in this situation since at least one instance of the collection is expected to satisfy the property being checked.

Table 1 is an example showing a partial list of testing goals for OrderMgmt. CO in the WS Operation column refers to Create Order operation. According to the table, Goal #1 tests Create Order operation under the predicate condition that no previous orders existed in the system under the test as indicated in the "Testing Goal Predicate" column's "count" parameter. A generated setup sequence that comprises of actions that set up this condition before the test action is performed is shown in the "[Set up sequence]+Testing Goal Invocation" column of Table 1. For Goal #1, this setup sequence is empty, since assuming that the system initially has no orders, no action is necessary to create the specified initial predicate condition. Goal #2 tests Create Order operation specifying the predicate condition that the initial state of the system should have one order. Thus, for this goal, setup sequence generated is a set of actions that would create one instance of an order in the system. Similarly, for Goal #3, testing goal predicate indicates that there should be more than one order existing in the system when the test is performed. Therefore, a setup sequence of actions for creating two orders in the system is generated for invocation, before the actual invocation of the test function.

| Goal # | WS Operation | Testing Goal Predicate | [set up sequence] + Testing Goal Invocation |
|---|---|---|---|
| 1 | CO | count(o:Order) = 0 | [ ], CO(999, 1234, 3, 1) |
| 2 | CO | count(o:Order) = 1 | [CO(999, 1234, 2, 1)], CO(999, 1234, 1, 2) |
| 3 | CO | count(o:Order) ≥ 2 | [CO(999, 1234, 2, 1), CO(999, 1234, 3, 2)], CO(999, 1234, 1, 3) |

In certain cases, a precondition may not have any quantification. For example, a precondition might not have any existential or universal constraint for a variable, yet an application's effect such as the web service operation effect may have an update, which creates an instance of a class. In the example, the precondition for Create Order does not quantify the variable Order. However, Create Order includes an update effect, which leads to creation of a new instance of Order. From a testing point of view, one would like to test such creation behaviors under different conditions of preexisting instances of Order. In such circumstances, the analysis may derive three independent testing goals obtained by conjoining the original guard with one of the following: COUNT(D)=0, COUNT(D))=1, COUNT(D)≥2. The resulting testing goals for operation Create Order are shown in Table 1.

The testing goals, for example, derived in this manner are input to a planner to derive a Set Up sequence of use case invocations. For example, Goal #1 in Table 1 requires that there be no Order instances in the system state prior to performing the operation under test (Create Order for this goal). This condition is satisfied by an empty sequence, indicated by an empty sequence [ ] in the last column of Table 1 for Goal #1. This example assumes that the initial world state contains one instance each of Customer and Product, but does not contain any instance of Order. A testing goal invocation corresponding to the operation under test is appended to the set up sequence to derive the test case. As another example, Goal #3 requires that there be at least two instances of Order class before performing the testing goal invocation as indicated in the testing goal predicate column under Goal #3. A planner of the present disclosure returns the set up sequence having two invocations of operation Create Order as shown in Table 1. Once a valid sequence of test invocations (including the testing goal invocation) that satisfies the testing goal is found, the planner simulates this sequence from the given initial world state. This simulation evolves the world state and can be depicted in the form of a UML Object Diagram.

Figure 3A:
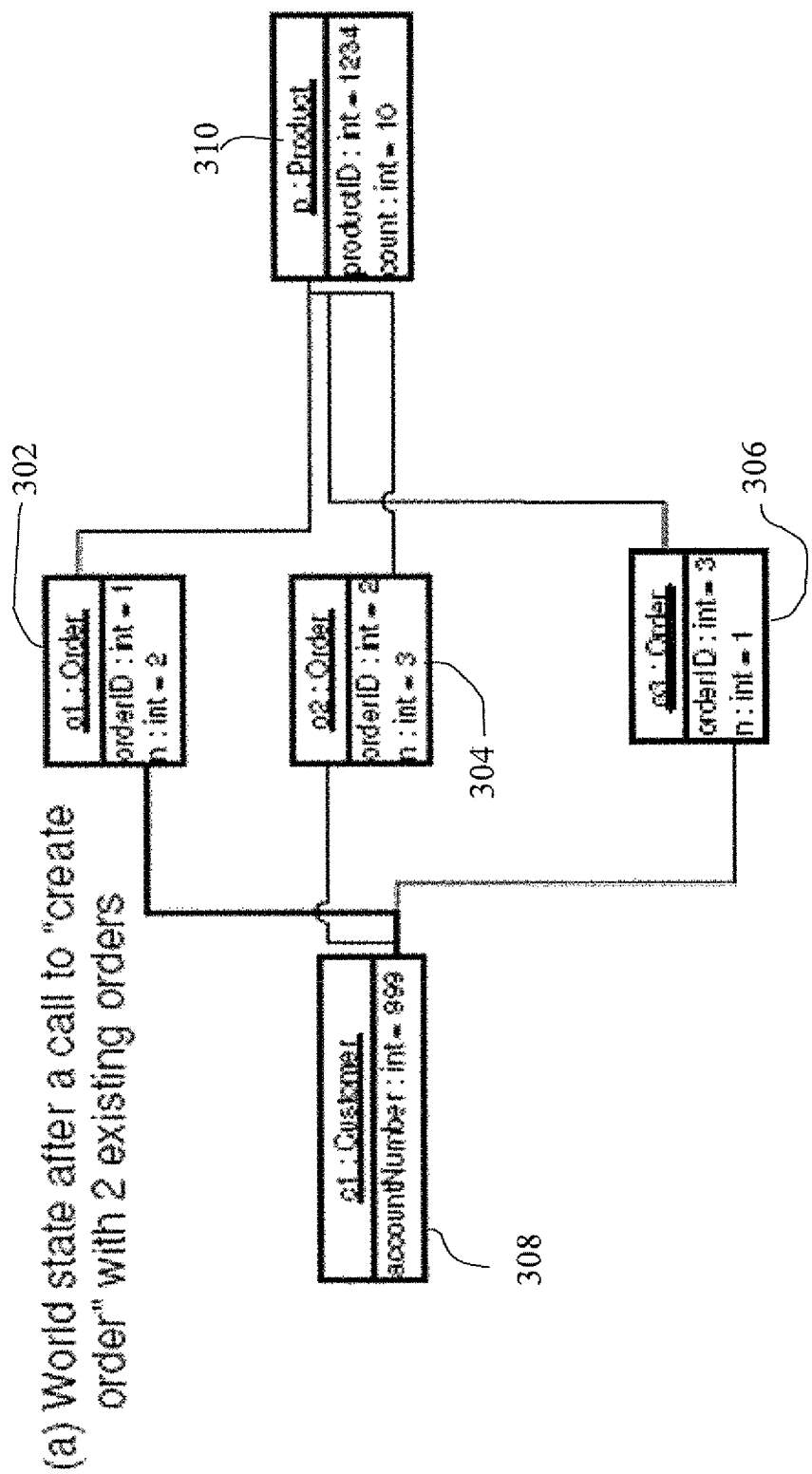
FIG. 3A shows an example of an object diagram that results after applying the test sequence.

FIG. 3A shows the object diagram that results after applying the test sequence for Goal #3 in Table 1. As shown, there exist three instances of Order class 302, 304 and 306. Two of the three Order class 302, 304 and the customer 308 and product 310 class instances are results of applying or invoking the setup sequence, and the third Order class instance resulted from invoking the testing goal function.

Figure 3B:
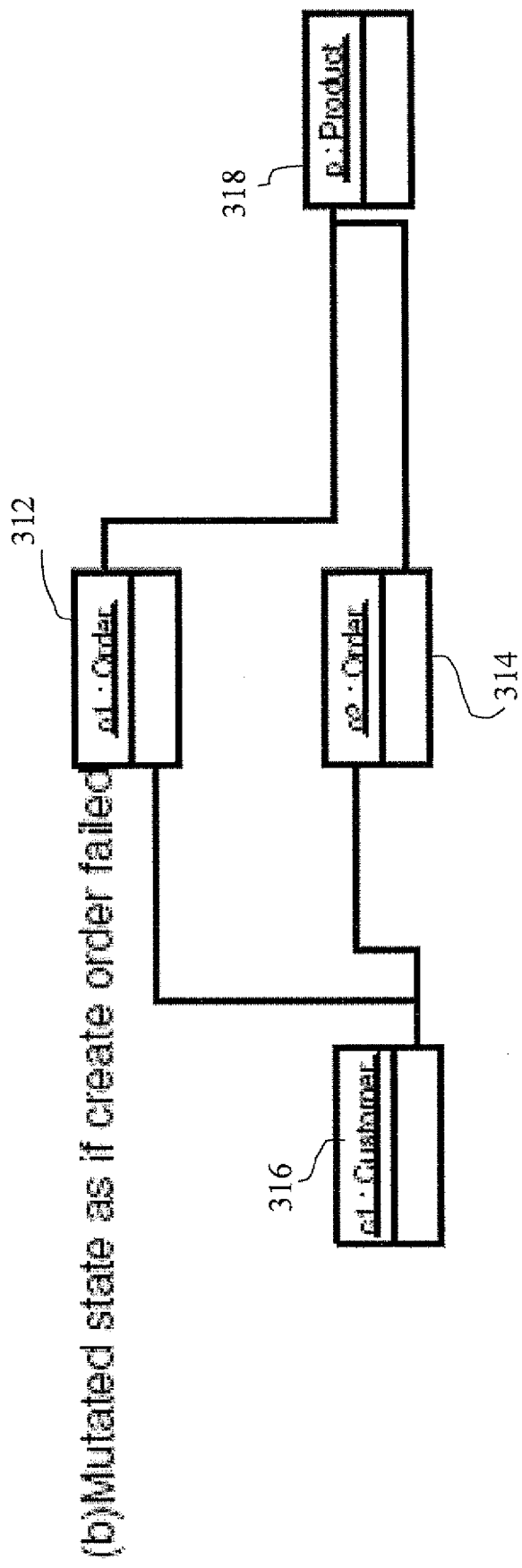
FIG. 3B illustrates an example of a No Instance Creation fault model for the world state.

To increase confidence in the testing process, the system and method of the present disclosure in one embodiment validates that the System Under Test (SUT) also reaches an internal system state, which is consistent with the world state resulting from the simulation process. In order to do, in one embodiment, the method distinguishes the obtained world state from other world states. Since there are potentially an infinite number of world states, the method in one embodiment prunes the space of world states to a manageable number A set of fault models is adopted, this time operating on the world states, to accomplish the task in one embodiment. FIG. 3B illustrates a No Instance Creation fault model for the world state. In FIG. 3A, note that object o3:Order 306 was created as a result of the testing goal invocation. This example assumes that a faulty implementation does not create its analog in the implementation state. Thus, an object diagram shows only objects o1 and o2 (312, 314) shown in FIG. 3B. The two object diagrams are distinguished from each other through an application of a suitable operation sequence referred to as a verification sequence. Inspection reveals that an invocation of operation Read Order (3, 3, 1) distinguishes the two object diagrams. The faulty version leads to execution of the exceptional condition in operation Read Order—returning a NULL order object since there is no order with oID of 3 in the fault model shown in FIG. 3B. Note that Read Order is an observer operation of the world state—it returns values of the order instance in a world state to the calling environment. Such observer operation, if present, is convenient for verification. The system and method of the present disclosure, however, need not require that an observer operation be present. For example, operation Delete Order(3, SUCCESS) would also distinguish the mutant with the same result—the faulty implementation returns Failure since again there is no order with oID of 3 to delete in the fault model shown in FIG. 3B. Identifying all the faulty versions of the system state is useful because in the absence of observer functions it is not possible to identify the kind of deviation for the states. Thus, the fault model predicts the various deviations from the expected and the verification sequence verifies that this indeed is the case.

Another example of an application to which the system and method of the present disclosure can be applied to generate test cases may include an ATM (automatic teller machine) application. A model of the application including a collection of its functions and/or objects, inputs, outputs, preconditions or predicates, and effects and like may be created. A testing goal may be automatically generated to test the functionalities of the application using the model. For instance, an example of a testing goal may be to test its account withdrawal functionality. In this example, the model and an initial state of the system being tested may be fed to a goal generation functionality of the present disclosure. An initial state of the system associated with ATM environment may include the number of user accounts, user account balances, and other conditions that specify the current state of the system. In addition, one or more fault models that specify known ways the application can fail may be input to the generation functionality of the present disclosure. In this scenario, examples of fault models may include withdrawing more than allowed amount, depositing into non-existing account, etc.

The goal generation functionality uses its input parameters to generate the testing goals. This may be done by looking at the preconditions for each of the operations and then subsequently refining them according to the method identified above. The existential and the universal constraints are interpreted considering various constraints. For instance, consider a precondition, $\forall$ account, balance$\geq$0, on a withdrawal operation. This will translate to various testing goals accounting for different amount of balance in the account. Similar goals can be derived for the withdrawal operation, which cover different states of the account such as a frozen account, etc., and like. Thus, the goal generation functionality may derive one or more input conditions and state conditions as testing objectives. An example of an input condition for the withdrawal function may be that "withdrawalAmount>0". An example of a state condition may be "exists account A, such that ID(A)= accounted". An input condition may be considered as constraints on an input parameter and the state condition may be considered as a constraint on the system state. The testing under these different testing conditions would produce different behavior.

Using the generated goal or goals, the application model, and possibly one or more fault models, a sequence of steps are generated that provide the test invocation steps that set up the preconditions or predicates for testing as well as the test function. In this ATM example, a predicate may be that a user has a valid account and is logged into the ATM system. A sequence of steps that simulate this predicate would be generated. Then a sequence of steps that make up the test function would be generated. Thus, the invocation steps may include creating a valid account, having a user log into the account, then performing a withdrawal.

Once the sequence of steps is invoked, the state of the system should change. For example, the user account should decrease by the withdrawn amount, a new log reflecting the user's action may be reported, etc. Using this changed state, a verification sequence is generated. The verification sequence comprises a set of steps that may be taken to verify whether the invoked test function performed as expected. An example of the verification sequence may be an action that makes an inquiry of the balance. Another example may be an action that tries to withdraw an amount that is greater than the remaining amount after the test function is performed. A failure status of this verification action would indicate that the test function performed properly.

The system and method also allow generation of executable test cases, for example, using a template, which can be applied to the various interfaces through which the web service may be accessed. A template specifies the exact function calls to invoke, buttons to press, and/or fields to populate, and like, for a specific interface being used to implement the test sequences.

A person of ordinary skill in the technological art will appreciate that other examples of applications for which the system and method of the present disclosure may be utilized abound.

An automated system and method were described to generate functional conformance tests for applications such as semantic web services which are defined using the Inputs, Outputs, Preconditions, Effects (IOPEs) paradigm or like. A system and method in one embodiment may also use a set of fault models to produce one or more testing goals. A novel planner component accepts these one or more testing goals to generate a sequence of invocations as a test case. Verification sequences are also generated. The system and method also allow generation of executable test cases, which can be applied to the various interfaces through which the application such as the web service may be accessed.

While the above example described an atomic service, for example, an atomic web service, the system and method of the present disclosure in another embodiment may also be extended to composite services, for instance, also defined using IOPE paradigm. The system and method in yet another embodiment may use a more on-the-fly approach where the test cases are not produced apriori but are generated in an adaptive manner.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer implemented method for generating a testing procedure for an implementation of a function, comprising:
    obtaining automatically a model of an application that has been implemented, the model including at least a description of input, output, and one or more state transitions of a function in the application, said application model being an input-output-precondition-effect (IOPE) model of a web service;
    refining one or more preconditions of the model based on a fault model that represents one or more ways the application can fail;
    generating a testing goal from the model, the testing goal including at least a state condition and a testing function and the one or more of the preconditions refined based on the fault model, wherein the testing goal is generated for each precondition-effect pair in the OIPE model;
    wherein the IOPE model is constructed as syntactic ensemble comprising input and output constraints pair for a target operation, using a template having corresponding placeholders that are to be replaced by actual values from an operation under test, and as a pair-set of precondition and effect for said operation, the pair-set defined in part as the testing goal,
    the fault model used as a leverage for redefining the testing goal and corresponding to the IOPE constraints, the fault model comprising one or more of boundary values for input parameters, cardinality constraints enforcing a threshold that is to be observed, and fault sensitization serving a behavioral basis for the testing goal;
    generating a sequence of one or more actions based on the testing goal, the one or more actions at least transforming a computer system's state running the application to meet the one or more preconditions;
    generating one or more expected output and a system end state associated with applying the sequence of one or more actions; and
    generating a sequence of one or more verification actions based on said one or more expected output and the system end state,
    wherein the sequence of one or more actions and the sequence of one or more verification actions are invoked to test the application, and
    wherein a functional test case generation is fully automated for the application.

2. The method of claim 1, wherein the sequence of one or more actions includes one or more function calls in the application.

3. The method of claim 1, wherein the step of obtaining a model includes obtaining information describing one or more objects and associated attributes of the application.

4. The method of claim 1, wherein the step of obtaining a model includes obtaining information describing interaction of a system on which the application may be executed with an environment via a set of operations.

5. The method of claim 4, wherein said information further includes describing the inputs from the environment to the system, describing outputs from the system to the environment, describing one or more pre-conditions of the operations in terms of the internal state of the system, and describing one or more effects of an operation on the internal state of the system.

6. The method of claim 1, wherein the model includes a use case description of the application.

7. The method of claim 1, wherein the model includes web service description of the application.

8. The method of claim 7, wherein the web service description is specified in Web Services Description Language (WSDL-SL Ontology Web Language (OWL-SL or combinations thereof.

9. The method of claim 1, wherein the model includes a functional description of the application.

10. The method of claim 1, wherein the second sequence of one or more actions includes automatically created one or more operations that distinguish the state of the system from other states.

11. The method of claim 1, wherein the test objectives validate the application for one or more functional properties as described in the model of the application.

12. A system for generating a testing procedure for an implementation of a function, comprising:
    an application model including at least one or more objects, one or more inputs and outputs associated with said one or more objects, one or more preconditions of a system employing the application, and one or more effects on the system applying said one or more objects, said application model being an input-output-precondition-effect (IOPE) model of a web service;
    a goal generator module operable to execute on a processor, the goal generator module further operable to refine said one or more preconditions based on a fault model that represents one or more ways the application can fail, the goal generator module further operable to automatically generate one or more testing goals using the application model and the one or more of the preconditions refined based on a fault model, wherein the testing goal is generated for each precondition-effect pair in the OIPE model,
    wherein the IOPE model is constructed as syntactic ensemble comprising input and output constraints pair for a target operation, using a template having corresponding placeholders that are to be replaced by actual values from an operation under test, and as a pair-set of precondition and effect for said operation, the pair-set defined in part as the testing goal,
    the fault model used as a leverage for redefining the testing goal and corresponding to the IOPE constraints, the fault model comprising one or more of boundary values for input parameters, cardinality constraints enforcing a threshold that is to be observed, and fault sensitization serving a behavioral basis for the testing goal;
    a planner module operable to execute on a processor to generate a sequence of one or more actions based on said one or more testing goals, the one or more actions at least transforming a computer system's state running the application to meet the one or more preconditions; and a verification sequence generator module operable to execute on a processor to generate a sequence of one or more verification actions based on one or more expected outputs from the sequence of one or more actions and an expected system end state resulting from the sequence of one or more actions, wherein the sequence of one or more actions and the sequence of one or more verification actions are invoked to test the application model, and wherein a functional test case generation is fully automated for the application model.

13. The system of claim 12, further including: a test script generator module operator to generate a test script for a selected interface using a template, the sequence of one or more actions and the sequence of one or more verification actions.

14. A non-transitory program storage device readable by a machine, tangibly embodying a program of instructions executable by the machine to perform a method of generating a testing procedure for an implementation of a function, comprising:

obtaining a model of an application, the model including at least one or more objects, one or more inputs and outputs associated with said one or more objects, one or more preconditions of a system employing the application, and one or more effects on the system applying said one or more objects, wherein the testing goal is generated for each precondition-effect pair in the input-output-precondition-effect (IOPE) model;

refining said one or more preconditions based on a fault model that represents one or more ways the application can fail;

generating a testing goal from the model, the testing goal including at least a state condition and a testing function and the one or more of the preconditions refined based on a fault model, wherein the testing goal is generated for each PE pair in the OIPE model;

wherein the IOPE model is constructed as syntactic ensemble comprising input and output constraints pair for a target operation, using a template having corresponding placeholders that are to be replaced by actual values from an operation under test, and as a pair-set of precondition and effect for said operation, the pair-set defined in part as the testing goal, the fault model used as a leverage for redefining the testing goal and corresponding to the IOPE constraints, the fault model comprising one or more of boundary values for input parameters, cardinality constraints enforcing a threshold that is to be observed, and fault sensitization serving a behavioral basis for the testing goal;

generating a sequence of one or more actions based on the testing goal, the one or more actions at least transforming a computer system's state running the application to meet the one or more preconditions;

generating one or more expected output and a system end state associated with applying the sequence of one or more actions; and generating a sequence of one or more verification actions based on said one or more expected output and the system end state, wherein the sequence of one or more actions and the sequence of one or more verification actions are invoked to test the application, and wherein a functional test case generation is fully automated for the application.

15. The non-transitory program storage device of claim 14, further including:

generating a test script implementing the sequence of one or more actions and the sequence of one or more verification actions using a template associated with a selected interface.

* * * * *